Patented Feb. 2, 1943

2,309,692

UNITED STATES PATENT OFFICE 2,309,692

SULPHUR POLYMER PLASTIC COMPOSITIONS

Martin B. Chittick, Wilmette, Ill., and Paul Vincent McKinney, Pittsburgh, Pa., assignors to The Pure Oil Company, Chicago, Ill., a corporation of Ohio No Drawing. Application December 6, 1939, Serial No. 307,812

6 Claims. (Cl. 260—79)

This invention relates to plastic compositions and to the method of preparing the same and is more particularly concerned with plastic compositions prepared by sulphurizing hydrocarbon polymers.

It is common practice in the refining of gasoline and similar light distillates produced by cracking of hydrocarbon oils, particularly at more elevated working temperatures in the neighborhood of 1000° F. or higher, and in the refining of gasoline or similar boiling material produced by conversion or polymerization of hydrocarbon gases, to contact the gasoline or similar distillate with various polymerizing catalysts such as fuller's earth or similar adsorptive clay at elevated temperature in order to selectively polymerize the gum forming and color imparting constituents contained therein. These gum forming or color imparting constituents are usually diolefins which readily polymerize and oxidize upon exposure to air and/or light.

In the well known Gray process cracked gasoline vapors are passed through a tower containing a bed of catalytic clay at temperatures ranging from approximately 200–400° F. and the resulting polymers are withdrawn in a liquid state from the bottom of the tower.

In another method of refining cracked distillates catalytic clay is either mixed with the distillate under sufficient pressure to maintain the distillate in substantially liquid phase and the mixture heated at temperatures of approximately 400–600° F. for a sufficient period of time to bring about the desired polymerization of the gum forming or color imparting bodies; or the distillate is passed through a chamber packed with the clay under high pressure conditions and at elevated temp. and the resulting polymers separated from the distillate by fractional distillation.

Polymers of a similar nature also result from the treatment of cracked distillates with selective polymerizing agent such as dilute sulphuric acid or cold concentrated sulphuric acid.

The methods hereinbefore set forth for the selective polymerization of gum forming and color imparting bodies in cracked distillates are well known in the art.

Various uses have heretofore been suggested for the polymers produced in accordance with the foregoing methods of treatment. At the present time they are being widely used in the preparation of core oils, in paints and varnishes, and as a binder for brake band and wall board compositions. These polymers have also been used to some extent combined with sulphur as an additive for extreme pressure lubricants and cutting oils.

It has been discovered that if hydrocarbon polymers prepared in accordance with the methods herein above set forth are chemically combined with sulphur under certain conditions, that a meltable plastic composition is produced which can be widely used in the industrial arts.

In accordance with the invention hydrocarbon polymers resulting from selective polymerization of the gum forming and color imparting bodies in cracked or polymerized gasoline or other light distillate obtained in the manner above set forth, are preferably reduced under vacuum and/or with steam under non-cracking conditions, in order to drive off low boiling material until the polymer has a solid content as determined by the A. S. T. M. method for varnish, in excess of 60% and preferably in excess of 80%. The polymer after reduction will have an iodine number (Wijs) in excess of 190 and as high as 300. When mixed with sulphur and heated for a period of time which may vary from four to fifteen hours at temperature ranging from approximately 200° to 305° F., the sulphur and polymer react chemically to produce a material which is solid at ordinary temperature but which upon being heated to temperatures above 120° F. but not substantially above 305° F., will melt without decomposition.

The product produced by reacting the sulfur and polymer under the conditions specified is not a vulcanized product since it is meltable without decomposition. The particular time and temperature of reaction will depend on the properties of the polymer and quantities of polymer and sulphur reacted and on the nature of the final product desired. Generally speaking, it may be said that the higher the solid content of the polymer, the shorter the reaction time in order to obtain a product of the desired hardness. Likewise, the greater the amount of sulphur in the composition, the shorter the amount of time necessary to obtain the product of desired hardness. With any particular mixture of polymer and sulphur, the longer the time of cooking and the higher the temperature thereof, the harder the end product will be. It is important, however, that the temperature of reaction shall not substantially exceed 305° F. because with temperatures above that, undesirable decomposition occurs. The sulphur is combined with the polymer in proportions of approximately 15 to 45% of sulphur to approximately 85 to 55% by weight of polymer, but the preferable range of sulphur is between 25 to 40%.

At temperatures below 200° F. the sulphur and polymer do not chemically react, but at temperatures of approximately 200° F., reaction takes place, as evidenced by the evolution of hydrogen sulfide, and the reaction progresses as the temperature is increased. When preparing a product in accordance with the invention, it is desirable that the temperature of the mixture of sulphur and polymer be slowly raised from a temperature of approximately 200° F. to the final reaction temperature, and that temperature be held at the maximum reaction temperature desired for the remainder of the reaction period.

Although the reaction may be expedited somewhat by the addition of catalysts such as sulphur chloride or phosphorus pentasulfide added in small amounts of approximately 1%, the use of such catalysts is not necessary for the reason that the reaction progresses satisfactorily and is completed in a relatively short time without the presence of catalysts.

As examples of polymers which are useful as starting materials in the preparation of products in accordance with the invention, the following are given:

Table I

|  | Polymer No. 1 | Polymer No. 2 |
| --- | --- | --- |
| Gravity A. P. I. | 15.5 to 18.5 | 10 to 11. |
| Flash °F | 175 minimum | 230 minimum. |
| Fire °F | 215 minimum | 280 minimum. |
| Viscosity-Saybolt Universal at 100. | 200–225 | 225–300. |
| Pour °F | 0-maximum | 45°-approx. |
| Iodine number | 195 minimum | 200 minimum. |
| Percent solids A. S. T. M. | 60–65 | 80–85. |

The two samples of polymer, the properties of which are given above, were prepared by contacting gasoline-containing vapors produced by high temperature cracking of petroleum oil, with fuller's earth at temperatures between 300–400° F. and reducing the resulting polymer with fire and steam at temperature up to approximately 600° F. until the desired solid content was obtained. These polymers are miscible in all proportions with petroleum naphtha.

The following are specific examples of products made in accordance with the invention using polymers 1 and 2 as starting material in which these polymers were reacted with various quantities of sulphur under different temperature conditions and for different lengths of time:

Example I

Polymer No. 2 was mixed with sulphur in the proportions of 15 parts by weight of sulphur and 35 parts by weight of polymer and the mixture was gradually heated up to a maximum temperature of 248° F. over a period of 9.3 hours. The resulting product was homogeneous, slightly soft and plastic and had an A. S. T. M. penetration of 35.9 mms. and an A. S. T. M. softening point of 123.8° F.

Example II

The same polymer was mixed with sulphur in the same proportions as in Example I and gradually heated for a period of nine hours from a temperature of 221° F. to 266° F. The resulting product was homogeneous and hard, having an A. S. T. M. penetration of 2.3 mms. and an A. S. T. M. softening point of 162.5° F.

Example III

Polymer No. 1 was mixed with sulphur in the proportions of 30 parts by weight of sulphur to 70 parts by weight of polymer and the mixture gradually heated for two hours from a temperature of 170° F. to 239° F. The resulting product was a homogeneous liquid at room temperature, thus indicating that either the time of reaction was too short or the temperature of reaction was too low, or possibly both.

Example IV

The same mixture as in Example III was gradually heated for a period of 5.8 hours from a temperature of 203° F. to 305° F. The resulting product was hard and brittle, having an A. S. T. M. penetration of 10.7 mm. and an A. S. T. M. softening of 136.8° F.

Example V 70 parts by weight of polymer No. 2 was mixed with 30 parts by weight of sulphur and the mixture gradually heated for 5.7 hours from a temperature of 158° to 284° F. A hard, brittle product resulted, having an A. S. T. M. penetration of 5.6 mm. and an A. S. T. M. softening point of 147.6° F.

Example VI

The same mixture was gradually heated for a period of 4.8 hours from a temperature of 194° F. to 270° F. The resulting product was slightly soft and plastic and had an A. S. T. M. penetration of 15.7 mm. and an A. S. T. M. softening point of 141.6° F.

Example VII

The same mixture was gradually heated for a period of 6.7 hours from a temperature of 203° F. to 275° F. The resulting product was hard and brittle with an A. S. T. M. penetration of 2.8 mm. and an A. S. T. M. softening point of 145.4° F.

Example VIII 60 parts of polymer No. 2 by weight was mixed with 40 parts by weight of sulphur and the mixture heated for a period of 8.2 hours from a temperature of 203° F. to 266° F. The resulting product was hard and brittle, having an A. S. T. M. penetration of 1.2 mm. and an A. S. T. M. softening point of 163.8° F.

Example IX 70 parts by weight of a 50–50 mixture of polymers 1 and 2 was mixed with 30 parts by weight of sulphur and the mixture gradually heated for a period of 12.3 hours from a temperature of 218° to 288° F. The resulting product was semi-solid and flowed slightly at room temperature. Because of the presence of the polymer of lower solid content the time of heating was not long enough or the temperature of reaction was not high enough.

In all the foregoing examples, the rate of heating was such that the temperature rose approximately one degree per minute until the maximum reaction temperature was reached and this temperature was then maintained for the balance of the reaction period. The best products were obtained by heating from 203° F. to 265° F. at such a rate that the temperature rose one degree per minute and then keeping the temperature at 265° F. for the balance of the reaction period.

The examples above set forth demonstrate that with the polymers of high solid content, hard products can be obtained by cooking for relatively short periods of time and at relatively low temperatures, whereas with the polymers of lower solid content, higher ranges of temperatures are required to obtain hard reaction products and longer periods of time are required for cooking.

The sulphurized polymers prepared in accordance with the foregoing examples and in accordance with this invention are soluble in toluene, benzene, carbon tetrachloride, methyl amyl ketone and ethylene chloride. The sulphur polymer possesses a negligible odor and for that reason is useful as a starting material in the preparation of industrial products such as floor tile.

The sulphurized polymer may be mixed with various fillers such as whiting, finely ground silica and fine slate flour to obtain products of greater hardness and toughness. The filler may be added at the end of the cooking period or the cooled sulphurized product may be remelted and the filler mixed therewith. As set forth in application, Serial No. 300,896, filed October 23, 1939 in the names of Paul V. McKinney and M. Glenn Maybery, the sulphurized polymer product may be mixed with various factices to make a tough composition useful as floor tiling or jointing material. The sulphur polymer itself is useful as a jointing or cementing compound either when used alone or when mixed with various fillers. The sulphurized polymer has a high resistance to acid, alkali and other chemicals and is therefore useful as a coating compound for protecting surfaces against corrosion. The product has further use as an impregnant of cellulosic material such as for impregnation of fabric which is subsequently vulcanized with rubber. The product is further useful as an ingredient in lacquers and paints because of its solubility in various solvents and its protective coating properties. The sulphurized polymer even when mixed with various fillers such as asbestos, whiting, clay and silica can be remelted and recast into any desired form or shape.

It will be seen, therefore, that we have succeeded in preparing a highly useful composition from comparatively cheap materials by a process which is comparatively simple.

As used in the following claims "distillate" includes liquid and vapor.

We claim:

1. The method of preparing a solid plastic composition which comprises mixing sulphur with hydrocarbon polymer resulting from the selective polymerization by means of catalytic clay of gum-forming and color-imparting bodies in petroleum hydrocarbon distillates so that the mixture contains from 15 to 45% by weight of sulphur in chemical combination, and heating the mixture to a temperature sufficiently high within the range of 200° F. to 305° F. for a period of time between 4 and 15 hours sufficient to produce a chemical reaction product which upon cooling forms a hard solidified mass.

2. Method in accordance with claim 1 in which the polymer has a solid content in excess of 60%.

3. Method in accordance with claim 1 in which the distillate is a light distillate produced by cracking of petroleum oil.

4. Method in accordance with claim 1 in which the distillate is a light distillate produced by conversion of petroleum hydrocarbon gases.

5. A composition of matter prepared in accordance with the method of claim 1, said composition being hard at normal atmospheric temperatures and meltable at temperatures above 120° F. without decomposition.

6. A composition of matter prepared in accordance with the method of claim 1, said composition being solid at normal atmospheric temperatures and meltable at temperatures between 120° F. and 305° F. without decomposition and being soluble in toluene, benzene, carbon tetrachloride, methyl amyl ketone and ethylene chloride.

MARTIN B. CHITTICK.
PAUL V. McKINNEY.